2,970,204

ELECTRIC WELDING METHOD AND COMPOSITION

John G. Piceu, Oak Park, Mich. (3830 Carriage Road, Birmingham, Mich.), and Melvin M. Gerson, New York, N.Y.; said Gerson assignor to said Piceu No Drawing. Filed Feb. 27, 1958, Ser. No. 717,815

15 Claims. (Cl. 219—92)

This invention relates to a method for protecting and welding iron and steel structures and coating compositions therefor and specifically to one package protective coating compositions of unlimited stability which are electrically conductive for protecting iron and steel structures against corrosion involving the sacrificial principle of corrosion protection while permitting them to be electrically welded without removal of the coating.

It has been a problem in the art to protect iron and steel parts, such as structural shapes, sheet, bar and plate stock which are to be joined by electrical welding from corrosion. The stocks of steel fabricating mills and field assembly crews often are subject to the elements and corrode rapidly. Prior art protective coatings interfere with welding of the steel and accordingly must be removed before welding is accomplished or require special welding techniques if the coating is not covered. Also, prior art coatings containing a sacrificial metal were unstable, the metal particles settling out in storage or shipment, and accordingly the ingredients were preferably shipped in separate containers and mixed just prior to use.

It is among the objects of this invention to provide a method for protecting steel structures against corrosion and the electrical welding thereof.

It is also among the objects of this invention to provide a protective coating which is electrically conductive and hence may be used on steel structures to be welded by standard techniques without removal of the coating.

It is another object of this invention to provide a protective coating composition for steel structures which forms tough, adherent coatings on both clean steel or mill oiled steel.

It is another object of this invention to provide a protective coating which contains a sacrificial metal to protect ferrous metal against corrosion by electrolytic action.

It is another object of this invention to provide a protective coating in which the sacrificial metal does not settle out or separate from the vehicle.

A further object of the invention is to provide a conductive, weldable coating composition which may be applied by spraying, brushing or dipping.

The method of the invention comprises coating surfaces of ferrous metal structures with a conductive coating composition comprising a thixotropic vehicle containing a condensation product of a polymerizable ester and a polyamide obtained from a polymerized fatty acid and an alkylene polyamine and zinc dust and electrically welding said structures together at said coated surfaces.

The composition of the invention comprises a thixotropic vehicle containing a condensation product of a polymerizable ester and a polyamide obtained from a polymerized fatty acid and an alkylene polyamine and containing zinc dust.

The coating composition preferably additionally contains thinners, et cetera, and may contain other pigments and extenders.

The thixotropic vehicle is prepared by condensing a polymerizable ester and the polyamide at a temperature between about 400° F. and 600° F. for a time sufficient to yield a thixotropic gel, normally about five minutes to two hours. The term polymerizable ester refers to one of the group consisting of:

Unsaturated glyceride oils, such as linseed oil, soya oil, et cetera;

Oil modified alkyd resins, such as castor oil or soya oil fatty acid-modified alkyds or esters of fatty acids with polyhydric alcohols;

Rosin esters or varnish ester bodies such as rosin-modified phenol formaldehyde resins, or fatty glyceride-modified rosin.

The above polymerizable esters are known and have been used as paint or varnish vehicles.

The polyamide is a polyamide formed from polymerized fatty acids (such as dimerized or trimerized linoleic acid) and alkylene polyamines, such as ethylene diamine, diethylene triamine, et cetera. Such polyamides are well known and a process for their manufacture is disclosed in United States Patent 2,450,940.

The condensation product of the ester and polyamide is miscible with mineral spirits and forms a thixotropic gel therewith. The gel supports the zinc dust and prevents its settling out. The condensation product preferably contains about 2 to 20% by weight of polyamide. The thixotropic vehicle containing the zinc dust becomes liquid on agitation and may be sprayed if stirring is continued. The coating dries rapidly to a handling condition in about 15 minutes. The coating can be baked to accelerate drying and to yield a tougher coating. It has been found that the coating need not be hard before welding; uncured coatings on steel weld satisfactorily.

The following examples illustrate the invention, although the invention is not intended to be limited thereby. All parts are by weight.

Example I

An oil modified alkyd resin is prepared by heating

Soya oil _____ 30
Tall oil (50% fatty acids) _____ 100
Pentaerythritol _____ 37
Calcium hydroxide _____ 0.2 to 450° F. and then add

Phthalic anhydride _____ 38
Maleic anhydride _____ 4.5 and heat to 500° F. until the acid number is about 6. The temperature is lowered to 450° F. and 10 parts of polyamide resin (dimerized linoleic acid-ethylene diamine condensate) is added and held at 420–450° F. with agitation for one hour. The resin is then cooled and thinned to 40% solids with mineral spirits. Then to 218 parts of this resin add 1350 parts of #22 zinc dust and mix until smooth. Thin to 20 seconds viscosity on #4 Ford cup with 215 parts of mineral spirits.

The resulting composition is coated on 0.035″ sheet steel to a thickness of 1½ mils. The sheets are welded after one hour, utilizing electrode pressure of 500 pounds, 10 cycle weld time at 6 volts and 10,000 amperes. Other sheets were exposed to salt spray for 500 hours and show no trace of rust. Such sheets were satisfactorily welded under the same conditions as above.

For most applications, a viscosity of about 18 to 23 seconds on #4 Ford cup is preferred. Other aliphatic thinners may be used, depending on the drying time desired.

*Example II*

An alkyd resin was prepared as in Example I from:

Soya oil _____ 160
Glycerine _____ 60
Sodium hydroxide _____ 0.1
Phthalic anhydride _____ 125

Fifteen parts of polyamide (dimerized linoleic acid—diethylene triamine) is added and held at 450° F. for one hour. After cooling, 57 parts of rosin-modified phenol-formaldehyde resin are added and thinned to 40% solids with mineral spirits. To 250 parts of this resin solution add 1550 parts of zinc dust, blend in and thin with 245 parts of mineral spirits and 1.1 parts of 6% cobalt naphthenate and 1.2 parts of lead naphthenate.

The resulting composition renders ferrous metal resistant to salt spray corrosion and is rapid drying. Steel sheets coated with the composition are readily electrically welded.

*Example III*

Two hundred forty parts of refined linseed oil are heated with 15 parts of the polyamide of Example I for one hour at 475° F. Thin to 40% solids and to 250 parts of resin add 1550 parts of zinc dust, blend and add 220 parts of VMP naphtha. Twenty parts of silicone resin (50% polymethyl phenol siloxane in toluene) are added. The resulting composition imparts high corrosion resistance to ferrous metals and steel coated therewith may be electrically welded by conventional techniques.

*Example IV*

A vehicle is prepared by reacting 80 parts of ester gum and 180 parts dehydrated castor oil at 600° F. The product is cooled and 12 parts of polyamide resin of Example II is added and heated to 400° F. for two hours. To 250 parts of 40% solution of resin add 1500 parts of zinc dust, 10 parts epoxy resin (reaction product of epichlorhydrin and bisphenol A) and 25 parts of strontium chromate. After mixing thin with 240 parts VMP naphtha.

The resulting coating composition is rapid drying on steel and forms a protective weld-through coating.

*Example V*

A vehicle is prepared by reacting

Rosin-modified phenol formaldehyde resin (Amberol M-93) _____ 160
Linseed oil _____ 320 at 500° F. Thirty grams polyamide of Example I is added and the reactants held at 500° F. for one hour. The product is thinned to 40% solids with mineral spirits and 500 parts of this resin solution is added to 3000 parts zinc dust and blended in 500 parts mineral spirits. The resulting coating composition is an excellent sacrificial coating for ferrous metals and does not interfere with electric welding of coated stock.

The coating composition thus contains zinc dust as the sacrificial metal and as the conductive material. The vehicle contains the ester-polyamide condensate and may contain additional resinous materials such as phenolics, alkyds, styrenated alkyds, epoxy resins, silicone resins as well as thinners, driers and other pigment materials. The zinc dust is preferably present in an amount of 65 to 85% by weight of the total composition.

It has been found that the coating composition covers well (about 600 square feet per gallon) and adheres well to cleaned steel, oil coated steel, galvanized metal (steel for example) primer, aluminum primed metal or phosphate coated metal.

In use a most effective method is to provide a dry film thickness of 1½ to 2 mils over clean or well oiled steel; this produces a coating having superior corrosion resistance. The coating may be air dried to handling condition in 15 minutes; baking the coating for 60 minutes at 250° F. produces maximum weathering characteristics.

In certain circumstances a coating on one mating face will prove satisfactory, such as in situations where a replacement part must be carried into the field for welding to a standard structure. Preferably, however, both mating surfaces are coated.

While the invention has been illustrated in terms of certain examples, such examples are not to be construed as limiting. It is intended to cover such modifications within the skill of the art that fall within the spirit and scope of the appended claims.

We claim:

1. The method of protecting and welding ferrous metal structures which comprises coating to a thickness sufficient to protect said surface against substantial corrosion at least one surface thereof with an electrically conductive coating composition comprising a thixotropic vehicle and zinc dust, said vehicle containing a thixotropic condensation product of a polymerizable ester and polyamide obtained from a polymerized fatty acid and an alkylene polyamine, said zinc dust being in an amount sufficient to render the resulting coating conductive and comprising about 65 to 85 percent by weight of said coating composition and electrically welding said structures together at at least a portion of said coated surface.

2. The method set forth in claim 1 wherein said polymerizable ester is a fatty oil-modified alkyd resin.

3. The method set forth in claim 1 wherein said ester is an unsaturated fatty glyceride oil.

4. The method set forth in claim 1 wherein said ester is a rosin-modified phenol formaldehyde-fatty oil ester.

5. The method set forth in claim 1 wherein said polyamide is the condensation product of dimerized linoleic acid and ethylene diamine.

6. The method set forth in claim 1 wherein said coating is baked prior to welding of said ferrous structures.

7. The method set forth in claim 1 wherein opposed surfaces are coated.

8. An electrically conductive, corrosion-resistant coating composition comprising zinc dust and a thixotropic vehicle, said vehicle containing a thixotropic condensation product of a polymerizable ester and a polyamide obtained from a polymerized fatty acid and an alkylene polyamine said zinc dust being in amount sufficient to render coatings prepared from said composition conductive and comprising about 65 to 85 percent by weight of said coating composition.

9. The composition set forth in claim 8 wherein said ester is a fatty oil-modified alkyd resin.

10. The composition set forth in claim 8 wherein said ester is an unsaturated fatty glyceride oil.

11. The composition set forth in claim 8 wherein said ester is a rosin-modified phenol formaldehyde-fatty oil ester.

12. The composition set forth in claim 8 wherein said polyamide is the condensation product of dimerized linoleic acid and ethylene diamine.

13. The composition set forth in claim 8 containing a hydrocarbon thinner.

14. The method set forth in claim 1 wherein said composition contains about 73 to 76 percent by weight of zinc.

15. The composition set forth in claim 8 wherein said zinc comprises about 73 to 76 percent by weight of said composition.

References Cited in the file of this patent

UNITED STATES PATENTS

| | | |
|---|---|---|
| 2,255,826 | Skeen | Sept. 16, 1941 |
| 2,379,413 | Bradley | July 3, 1945 |
| 2,423,290 | Bonwit | July 1, 1947 |
| 2,452,805 | Sussenbach | Nov. 2, 1948 |
| 2,517,754 | Young | Apr. 8, 1950 |
| 2,632,237 | Miller | Mar. 29, 1953 |
| 2,663,649 | Winkler | Dec. 22, 1953 |
| 2,695,908 | Witcoff | Nov. 30, 1954 |
| 2,707,708 | Witcoff | May 3, 1955 |
| 2,721,186 | Tauney | Oct. 18, 1955 |
| 2,728,737 | Witcoff | Dec. 27, 1955 |
| 2,823,189 | Floyd | Feb. 11, 1958 |
| 2,852,396 | Kinneman | Sept. 16, 1958 |

FOREIGN PATENTS

| | | |
|---|---|---|
| 570,033 | Great Britain | June 19, 1945 |
| 825,910 | France | Dec. 16, 1937 |

OTHER REFERENCES

Moncrieff: "Paint Manufacture," XIV, December 12, 1944, pages 339–342.

Mayne: "Paint Manufacture," November 1947, pages 380–382.